9736X
J. Matthews,
Fire-Proof Safe.
Patented June 16, 1836.
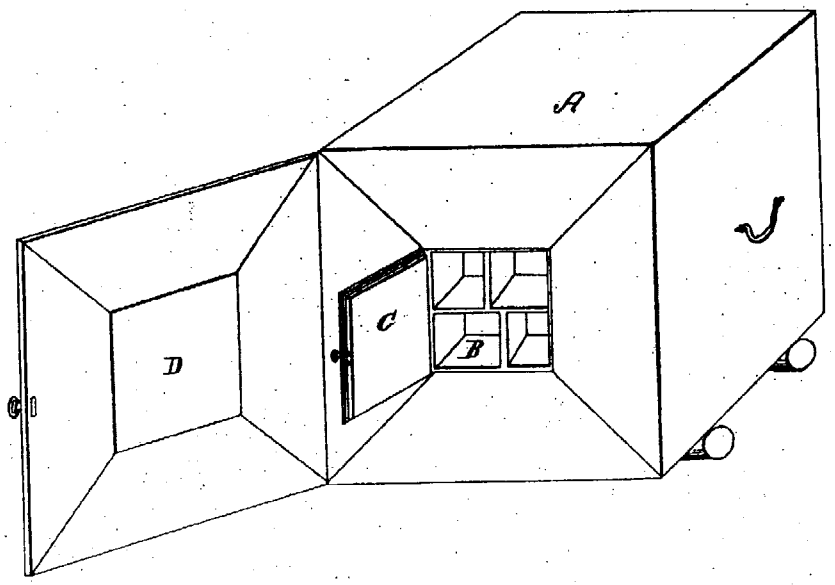
AM. PHOTO-LITHO. CO. N.Y. (OSBORNE'S PROCESS.)

9736x

The schedule referred to in these Letters Patent and ma-
king part of the same containing a description in the words
of the said James Matthews himself of his improvement
in the Fire proof chest.

---

Be it known that I James Matthews of the city, county
and State of New York have made a new and useful improve-
ment in the fire proof chest for preserving books, papers &c.
called Matthews fire proof chest, which is described as follows
reference being had to the annexed drawing of the same ma-
king part of this specification.

The chest or safe consists of two cases A & B: the interior
one B in which the papers &c is made of sheet iron and placed
[illegible] from the exterior case, also made of sheet iron,
[illegible] the space between them being filled with a compo-
sition the component parts of which are [illegible] Roman
Cement alum and glue. The interior case B is closed
by the door C covered with sheet iron & containing the same
composition. The outer door D is also made of sheet iron
and contains the composition before mentioned. It is made
[illegible] on the inside to close tight upon the inner case B
as represented in the drawing.

The chest is provided with [illegible] castors or rollers
and handles for moving it from place to place.

What I claim as my invention or discovery is
the before described method of constructing fire proof chests
for preserving books, papers & other articles.

James Matthews

Witness: Wm P. Elliot
[illegible]